(12) United States Patent
Weaver et al.

(10) Patent No.: US 8,192,205 B2
(45) Date of Patent: Jun. 5, 2012

(54) DEMONSTRATIVE METHODS FOR SANITARY TISSUE PRODUCTS

(75) Inventors: Gregg Thomas Weaver, Liberty Township, OH (US); Dean Larry DuVal, Lebanon, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 652 days.

(21) Appl. No.: 12/352,088

(22) Filed: Jan. 12, 2009

(65) Prior Publication Data

US 2010/0178646 A1   Jul. 15, 2010

(51) Int. Cl.
G09B 25/00   (2006.01)

(52) U.S. Cl. ........................................ 434/367

(58) Field of Classification Search .......... 434/276, 434/300, 365, 367, 433
See application file for complete search history.

(56) References Cited

U.S. PATENT DOCUMENTS

| 4,076,663 A * | 2/1978 | Masuda et al. ............ 525/54.31 |
| 5,057,915 A | 10/1991 | Von Kohorn |
| 5,947,302 A | 9/1999 | Miller |
| 6,059,928 A | 5/2000 | Van Luu et al. |
| 6,174,412 B1 * | 1/2001 | Paterson-Brown et al. .... 162/95 |
| 6,207,013 B1 * | 3/2001 | Oriaran et al. ................ 162/111 |
| 6,248,946 B1 | 6/2001 | Dwek |
| 6,469,130 B1 * | 10/2002 | Qin et al. ...................... 528/310 |
| 6,679,705 B2 | 1/2004 | Supinski et al. |
| 6,977,116 B2 | 12/2005 | Cabell et al. |
| 6,982,649 B2 | 1/2006 | Blum et al. |
| 7,572,504 B2 | 8/2009 | Smith et al. |
| 7,665,659 B2 * | 2/2010 | Gillespie et al. .............. 235/381 |
| 7,731,085 B2 | 6/2010 | Gillespie et al. |
| 2006/0110719 A1 * | 5/2006 | DeLack Hultin et al. .... 434/365 |
| 2006/0201841 A1 | 9/2006 | Mohr et al. |
| 2009/0173654 A1 * | 7/2009 | Steenblik et al. .......... 206/459.5 |

OTHER PUBLICATIONS

U.S. Appl. No. 12/138,778 (P&G Case 11082), All Office Actions.
U.S. Appl. No. 12/138,797 (P&G Case 11083), All Office Actions.

* cited by examiner

*Primary Examiner* — Kurt Fernstrom
(74) *Attorney, Agent, or Firm* — C. Brant Cook; Christian M. Best

(57) ABSTRACT

Demonstrative methods for sanitary tissue products, for example toilet tissue products, and more particularly, methods for demonstrating absorbency-based consumption differences between two or more toilet tissue products, and toilet tissue product packages and marketing articles that evidence absorbency-based consumption differences between toilet tissue products are provided.

20 Claims, 3 Drawing Sheets

DEMONSTRATIVE METHODS FOR SANITARY TISSUE PRODUCTS

FIELD OF THE INVENTION

The present invention relates to demonstrative methods for sanitary tissue products, for example toilet tissue products, and more particularly, to methods for demonstrating absorbency-based consumption differences between two or more toilet tissue products and toilet tissue product packages and marketing articles that evidence absorbency-based consumption differences between toilet tissue products.

BACKGROUND OF THE INVENTION

Consumers of toilet tissue products continue to demand more and more improved properties in their toilet tissue products. As a result, formulators are continually trying to improve upon toilet tissue product properties that are desired by consumers. However, formulators are faced with trying to communicate to the consumers, especially in a meaningful, clear and visual manner, their toilet tissue product's improved property compared to other toilet tissue products. In particular, to date no one has been able to meaningfully, clearly and/or visually evidence to consumers their toilet tissue product's improved absorbency-based consumption property.

Accordingly, there is a need for a method for demonstrating to a consumer absorbency-based consumption property differences between two or more toilet tissue products; and toilet tissue product packages and marketing articles that evidence different absorbency-based consumption properties of different toilet tissue products.

SUMMARY OF THE INVENTION

The present invention fulfills the needs described above by providing a method for demonstrating to a consumer absorbency-based consumption property differences between two or more sanitary tissue products, for example toilet tissue products; and sanitary product packages and marketing articles that evidence different absorbency-based consumption properties of different sanitary tissue products, for example toilet tissue products.

In one example of the present invention, a method for demonstrating to a consumer absorbency-based consumption property differences between two or more toilet tissue products, the method comprising the steps of:

a. subjecting a first toilet tissue product and a second toilet tissue product to an Absorbency-Based Consumption Test Method, which produces results that demonstrate to a consumer the absorbency-based consumption property differences between the first and second toilet tissue products; and b. presenting the results to the consumer, is provided. It has been found that the absorbency-based consumption property differences between two or more toilet tissue products obtained from the Absorbency-Based Consumption Test Method correlates relatively well with the relative differences between consumers' actual consumption of the two or more toilet tissue products as established by consumption diary studies.

In another example of the present invention, a toilet tissue product package comprising a non-textual indicia that evidences to a consumer of the toilet tissue product package that the toilet tissue product exhibits a absorbency-based consumption property different from another toilet tissue product, is provided.

In yet another example of the present invention, a marketing article comprising non-textual indicia that evidences to a consumer of a toilet tissue product that the toilet tissue product exhibits a absorbency-based consumption property different from another toilet tissue product, is provided.

Accordingly, the present invention provides a method for demonstrating to a consumer absorbency-based consumption property differences between two or more toilet tissue products; and toilet tissue product packages and marketing articles that evidence different absorbency-based consumption properties of different toilet tissue products.

DETAILED DESCRIPTION OF THE INVENTION

Definitions

Figure 1:
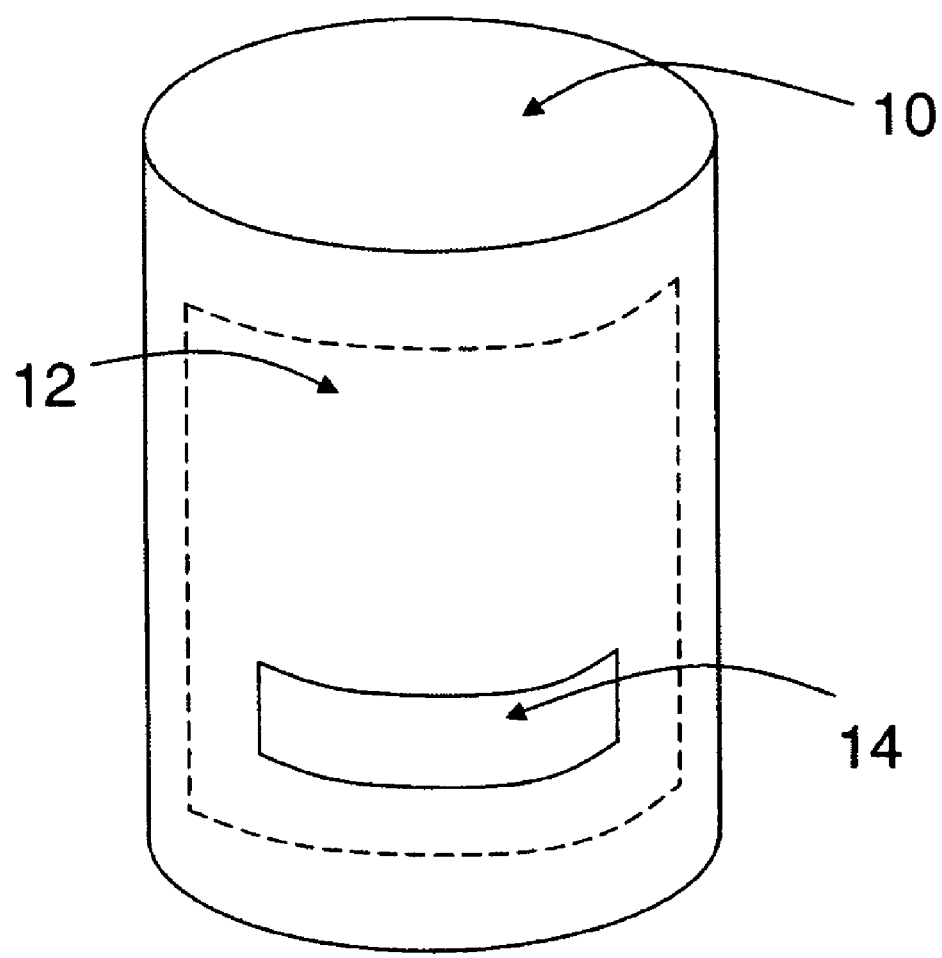
FIG. 1 is a schematic representation of an example of a sanitary tissue product package, for example a toilet tissue product package, according to the present invention.

"Fiber" as used herein means an elongate particulate having an apparent length greatly exceeding its apparent diameter, i.e. a length to diameter ratio of at least about 10. Fibers having a non-circular cross-section are common; the "diameter" in this case may be considered to be the diameter of a circle having cross-sectional area equal to the cross-sectional area of the fiber. More specifically, as used herein, "fiber" refers to fibrous structure-making fibers. The present invention contemplates the use of a variety of fibrous structure-making fibers, such as, for example, natural fibers, including wood fibers, or synthetic fibers made from natural polymers and/or synthetic fibers, or any other suitable fibers, and any combination thereof.

"Fibrous structure" as used herein means a structure (web) that comprises one or more fibers. Nonlimiting examples of processes for making fibrous structures include known wet-laid fibrous structure making processes, air-laid fibrous structure making processes, meltblowing fibrous structure making processes, co-forming fibrous structure making processes, and spunbond fibrous structure making processes. Such processes typically include steps of preparing a fiber composition, oftentimes referred to as a fiber slurry in wet-laid processes, either wet or dry, and then depositing a plurality of fibers onto a forming wire or belt such that an embryonic fibrous structure is formed, drying and/or bonding the fibers together such that a fibrous structure is formed, and/or further processing the fibrous structure such that a finished fibrous structure is formed. The fibrous structure may be a through-air-dried fibrous structure and/or conventionally dried fibrous structure. The fibrous structure may be creped or uncreped. The fibrous structure may exhibit differential density regions or may be substantially uniform in density. The fibrous structure may be pattern densified, conventionally felt-presses and/or high-bulk, uncompacted. The fibrous structures may be homogenous or multilayered in construction.

After and/or concurrently with the forming of the fibrous structure, the fibrous structure may be subjected to physical transformation operations such as embossing, calendering, selfing, printing, folding, softening, ring-rolling, applying additives, such as latex, lotion and softening agents, combining with one or more other plies of fibrous structures, and the like to produce a finished fibrous structure that forms and/or is incorporated into a sanitary tissue product.

"Sanitary tissue product" as used herein means a wiping implement for post-urinary and/or post-bowel movement cleaning (toilet tissue), for otorhinolaryngological discharges (facial tissue) and/or multi-functional absorbent and cleaning uses (absorbent towels such as paper towels and/or wipes).

The sanitary tissue products of the present invention may comprise one or more fibrous structures and/or finished fibrous structures.

The sanitary tissue products of the present invention may exhibit a basis weight between about 10 $g/m^2$ to about 120 $g/m^2$ and/or from about 15 $g/m^2$ to about 110 $g/m^2$ and/or from about 20 $g/m^2$ to about 100 $g/m^2$ and/or from about 30 to 90 $g/m^2$. In addition, the sanitary tissue product of the present invention may exhibit a basis weight between about 40 $g/m^2$ to about 120 $g/m^2$ and/or from about 50 $g/m^2$ to about 110 $g/m^2$ and/or from about 55 $g/m^2$ to about 105 $g/m^2$ and/or from about 60 to 100 $g/m^2$.

The sanitary tissue products of the present invention may exhibit a total dry tensile strength of greater than about 59 g/cm (150 g/in) and/or from about 78 g/cm (200 g/in) to about 394 g/cm (1000 g/in) and/or from about 98 g/cm (250 g/in) to about 335 g/cm (850 g/in). In addition, the sanitary tissue product of the present invention may exhibit a total dry tensile strength of greater than about 196 g/cm (500 g/in) and/or from about 196 g/cm (500 g/in) to about 394 g/cm (1000 g/in) and/or from about 216 g/cm (550 g/in) to about 335 g/cm (850 g/in) and/or from about 236 g/cm (600 g/in) to about 315 g/cm (800 g/in). In one example, the sanitary tissue product exhibits a total dry tensile strength of less than about 394 g/cm (1000 g/in) and/or less than about 335 g/cm (850 g/in).

In another example, the sanitary tissue products of the present invention may exhibit a total dry tensile strength of greater than about 315 g/cm (800 g/in) and/or greater than about 354 g/cm (900 g/in) and/or greater than about 394 g/cm (1000 g/in) and/or from about 315 g/cm (800 g/in) to about 1968 g/cm (5000 g/in) and/or from about 354 g/cm (900 g/in) to about 1181 g/cm (3000 g/in) and/or from about 354 g/cm (900 g/in) to about 984 g/cm (2500 g/in) and/or from about 394 g/cm (1000 g/in) to about 787 g/cm (2000 g/in).

The sanitary tissue products of the present invention may exhibit a total wet tensile strength of less than about 78 g/cm (200 g/in) and/or less than about 59 g/cm (150 g/in) and/or less than about 39 g/cm (100 g/in) and/or less than about 29 g/cm (75 g/in).

The sanitary tissue products of the present invention may exhibit a density of less than about 0.60 $g/cm^3$ and/or less than about 0.30 $g/cm^3$ and/or less than about 0.20 $g/cm^3$ and/or less than about 0.10 $g/cm^3$ and/or less than about 0.07 $g/cm^3$ and/or less than about 0.05 $g/cm^3$ and/or from about 0.01 $g/cm^3$ to about 0.20 $g/cm^3$ and/or from about 0.02 $g/cm^3$ to about 0.10 $g/cm^3$.

The sanitary tissue products of the present invention may be in any suitable form, such as in a roll, in individual sheets, in connected, but perforated sheets, in a folded format or even in an unfolded.

The sanitary tissue products of the present invention may comprises additives such as softening agents, temporary wet strength agents, permanent wet strength agents, bulk softening agents, lotions, silicones, and other types of additives suitable for inclusion in and/or on sanitary tissue products.

"Ply" or "plies" as used herein means an individual finished fibrous structure optionally to be disposed in a substantially contiguous, face-to-face relationship with other plies, forming a multiple ply ("multi-ply") sanitary tissue product.

It is also contemplated that a single-ply sanitary tissue product can effectively form two "plies" or multiple "plies", for example, by being folded on itself.

"Machine Direction" or "MD" as used herein means the direction parallel to the flow of the fibrous structure through the papermaking machine and/or product manufacturing equipment. In one example, once incorporated into a sanitary tissue product, the MD of the fibrous structure may be the MD of the sanitary tissue product.

"Cross Machine Direction" or "CD" as used herein means the direction perpendicular to the machine direction in the same plane of the fibrous structure. In one example, once incorporated into a sanitary tissue product, the CD of the fibrous structure may be the CD of the sanitary tissue product.

"Evidence" and/or "evidences" as used herein means that a toilet tissue package, toilet tissue and/or marketing article comprises non-textual indicia that conveys information to a consumer about a toilet tissue product. In one example, the information about the toilet tissue product may be conveyed intuitively from non-textual indicia present on a toilet tissue package, toilet tissue and/or marketing article to a consumer.

"Intuitively" as used herein means that a consumer interprets non-textual indicia based on the consumer's previous life experiences and/or knowledge.

"Indicia" as used herein means an indicator that conveys information to a consumer.

"Textual indicia" as used herein means text indicia, such as a word and/or phrase that conveys information to a consumer. In one example, a toilet tissue product is housed in a package comprising a textual indicia; namely, the word "strong."

"Brand name" as used herein means a single source identifier, in other words, a brand name identifies a product and/or service as exclusively coming from a single commercial source (i.e., company). An example of a brand name is Charmin®, which is also a trademark. Brand names are non-limiting examples of textual indicia. The sanitary tissue products of the present invention may be marketed and/or packaged under a common brand name (i.e., the same brand name, such as Charmin®). In addition to the brand name, a product descriptor may also be associated with the sanitary tissue products, such as "Ultra Strong" and/or "Ultra Soft" for example).

"Non-textual indicia" as used herein means non-text indicia that evidences information about a product to a consumer through a consumer's senses. In one example, non-textual indicia may evidence, even intuitively evidence, to a consumer through sight (visual indicia), through touch (texture indicia) and/or through smell (scent indicia).

Nonlimiting examples of non-textual indicia include pictures, graphs, drawings, representations such as product representations comparing two or more products, images, icons, colors, textures, patterns, such as emboss patterns and/or emboss pattern images, character representations, action representations, and mixture thereof.

As used herein, "basis weight" as used herein is the weight per unit area of a sample reported in lbs/3000 $ft^2$ or $g/m^2$. The basis weight is measured herein by the basis weight test method described in the Test Methods section herein.

"Absorbency-Based Consumption" as used herein means the amount of product consumed by consumers on a per use basis, in relation to the product's absorbency properties. For example, the amount of toilet tissue product a consumer will use per wipe can be correlated to the absorbency or moisture wicking properties inherent to the product. The Absorbency-Based Consumption for a toilet tissue product can be a numeric value, product visualization, or graphical representation demonstrating the absorbency properties of the product and correlating them to the average number of sheets used per wipe. A test method for measuring and visualizing Absorbency-Based Consumption is described herein.

As used herein, "texture" as used herein means any pattern present in the fibrous structure. For example, a pattern may be imparted to the fibrous structure during the fibrous structure-making process, such as during a through-air-drying step. A pattern may also be imparted to the fibrous structure by embossing the finished fibrous structure during the converting process and/or by any other suitable process known in the art.

Method for Demonstrating to a Consumer

The method for demonstrating absorbency-based consumption property differences between two or more toilet tissue products comprises the step of subjecting a first toilet tissue product and a second toilet tissue product to an Absorbency-Based Consumption Test Method described herein.

The Absorbency-Based Consumption Test Method utilized to obtain the absorbency-based consumption results may comprise the steps of:

a. applying moisture to the first and second toilet tissue products; and b. unwinding the moistened first and second toilet tissue products from the tissue roll such that the absorbency-based consumption property difference between the first and second toilet tissue products is visible to a consumer.

In one example, the absorbency-based consumption results obtained from the Absorbency-Based Consumption Test Method for two or more sanitary tissue products, for example toilet tissue products, may comprise the average number of sheets used per wipe by each of the sanitary tissue products, for example toilet tissue products; the number of layers on a roll of sheets wetted per spray of water for each of the sanitary tissue products, for example toilet tissue products and/or the number of sheets used per wipe associated with the number of layers on a roll of sheets wetted per spray of water for each of the sanitary tissue products, for example toilet tissue products.

The results may be presented to consumers in various ways known to those skilled in the art. Nonlimiting examples of ways that the results may be presented to consumers include visually, numerically and/or graphically. Visually presenting the results may include conducting a simulated, in-use performance of the sanitary tissue product, for example toilet tissue product, in the presence of one or more consumers and then showing the results; showing the results to a consumer in person; and/or representing the results in an image, such as a photograph, to which a consumer has access.

Numerically presenting the results to consumers may include providing the average number of sheets used per wipe to the consumers, providing the number of toilet sheets wetted from each of the toilet tissue products, and/or providing the length of toilet tissue wetted from each of the toilet tissue products.

Graphically presenting the results to consumers may include providing a graph that evidences the results.

The results may be presented in one or more of the following ways: airing a television commercial comprising the results; placing the results on the Internet; distributing a print advertisement comprising the results; distributing the results on sanitary tissue product packages, for example toilet tissue product packages; displaying the results on an in-store display; and/or displaying the results on a billboard.

The results may be obtained from the Absorbency-Based Consumption Test Method described herein. The Absorbency-Based Consumption Test Method may comprise the steps of: applying moisture, such as water, to a first and second sanitary tissue product, for example toilet tissue product while the product is on a roll of toilet tissue product; and unwinding the roll to visually demonstrate the ability of the first and second sanitary tissue products, for example toilet tissue products, such that the absorbency-based consumption property differences between the first and second sanitary tissue products, for example toilet tissue products, is evidenced, such as visible, to a consumer of a sanitary tissue product, for example toilet tissue product.

Sanitary Tissue Product (for example Toilet Tissue Product) Package

As shown in FIG. 1, a sanitary tissue product, for example toilet tissue product, package 10 according to the present invention houses a toilet tissue product 12, wherein the package 10 may comprise non-textual indicia 14 that evidences to a consumer of the toilet tissue product package 10 that the toilet tissue product 12 exhibits a absorbency-based consumption property different from another toilet tissue product.

The sanitary tissue product package 10 may comprise non-textual indicia 14 selected from the group consisting of: pictures, graphs, drawings, representations, images, icons and mixtures thereof.

Marketing Article

Figure 2:
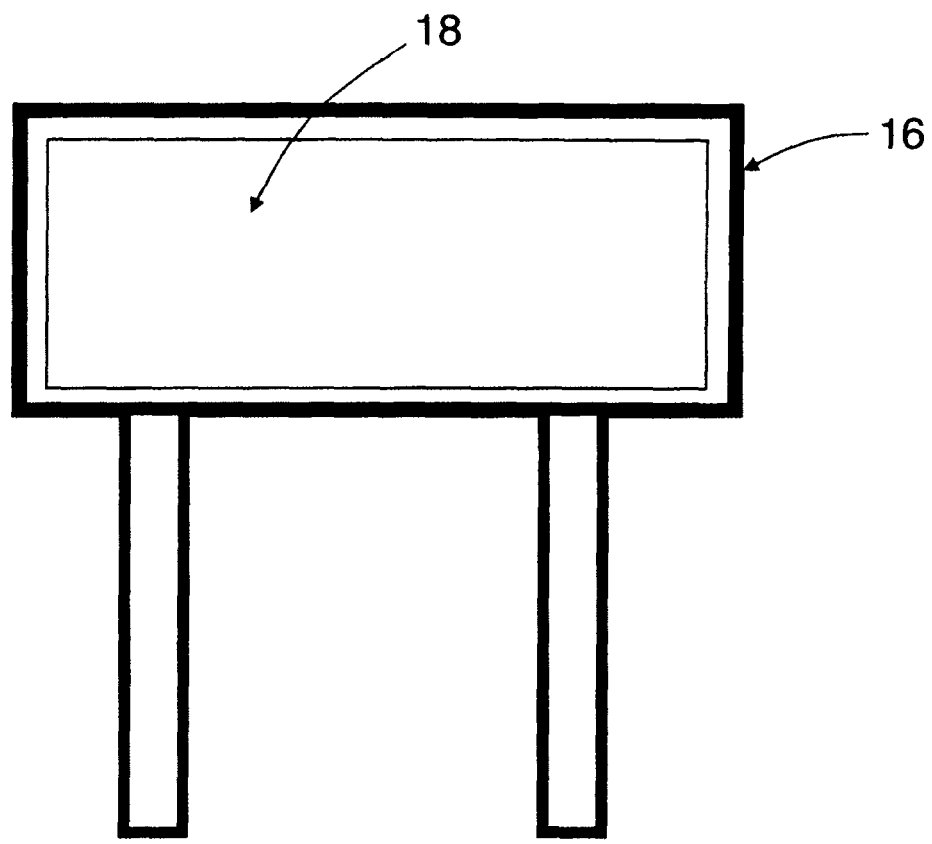
FIG. 2 is a schematic representation of an example marketing article according to the present invention.

As shown in FIG. 2, a marketing article, for example a billboard, 16 may comprise non-textual indicia 18 that evidences to a consumer of a sanitary tissue product, for example a toilet tissue product, that the toilet tissue product exhibits a absorbency-based consumption property different from another toilet tissue product.

The marketing article 16 may comprise non-textual indicia 18 selected from the group consisting of: pictures, graphs, drawings, representations, images, icons and mixtures thereof.

The marketing article 16 may be selected from the group consisting of: print advertisements, in-store display advertisements, billboard advertisements, television advertisements, Internet advertisements and mixtures thereof.

Test Methods

Unless otherwise indicated, all tests described herein including those described under the Definitions section and the following test methods are conducted on samples, fibrous structure samples and/or sanitary tissue product samples and/or handsheets that have been conditioned in a conditioned room at a temperature of 73° F.±4° F. (about 23° C.±2.2° C.) and a relative humidity of 50%±10% for 2 hours prior to the test. Further, all tests are conducted in such conditioned room. Tested samples and felts should be subjected to 73° F.±4° F. (about 23° C.±2.2° C.) and a relative humidity of 50%±10% for 2 hours prior to testing.

Basis Weight Method:

Basis weight is measured by preparing one or more samples of a certain area ($m^2$) and weighing the sample(s) of a fibrous structure according to the present invention and/or a sanitary toilet tissue product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples ($m^2$). The basis weight ($g/m^2$) is calculated by dividing the average weight (g) by the average area of the samples ($m^2$).

Dry Tensile Strength Test Method:

One (1) inch by five (5) inch (2.5 cm×12.7 cm) strips of fibrous structure and/or sanitary toilet tissue product are provided. The strip is placed on an electronic tensile tester Model 1122 commercially available from Instron Corp., Canton, Mass. in a conditioned room at a temperature of 73° F.±4° F. (about 28° C.±2.2° C.) and a relative humidity of 50%±10%. The crosshead speed of the tensile tester is 2.0 inches per minute (about 5.1 cm/minute) and the gauge length is 4.0 inches (about 10.2 cm). The Dry Tensile Strength can be measured in any direction by this method. The "Total Dry Tensile Strength" or "TDT" is the special case determined by the arithmetic total of MD and CD tensile strengths of the strips.

Wet Tensile Strength Test Method:

An electronic tensile tester (Thwing-Albert EJA Materials Tester, Thwing-Albert Instrument Co., 10960 Dutton Rd., Philadelphia, Pa., 19154) is used and operated at a crosshead speed of 4.0 inch (about 10.16 cm) per minute and a gauge length of 1.0 inch (about 2.54 cm), using a strip of a fibrous structure and/or sanitary tissue product of 1 inch wide and a length greater than 3 inches long. The two ends of the strip are placed in the upper jaws of the machine, and the center of the strip is placed around a stainless steel peg (0.5 cm in diameter). After verifying that the strip is bent evenly around the steel peg, the strip is soaked in distilled water at about 20° C. for a soak time of 5 seconds before initiating cross-head movement. The initial result of the test is an array of data in the form load (grams force) versus crosshead displacement (centimeters from starting point).

The sample is tested in two orientations, referred to here as MD (machine direction, i.e., in the same direction as the continuously wound reel and forming fabric) and CD (cross-machine direction, i.e., 90° from MD). The MD and CD wet tensile strengths are determined using the above equipment and the Total Wet Tensile is determined by taking the sum of these two values.

Absorbency-Based Consumption Test Method

Figure 3:
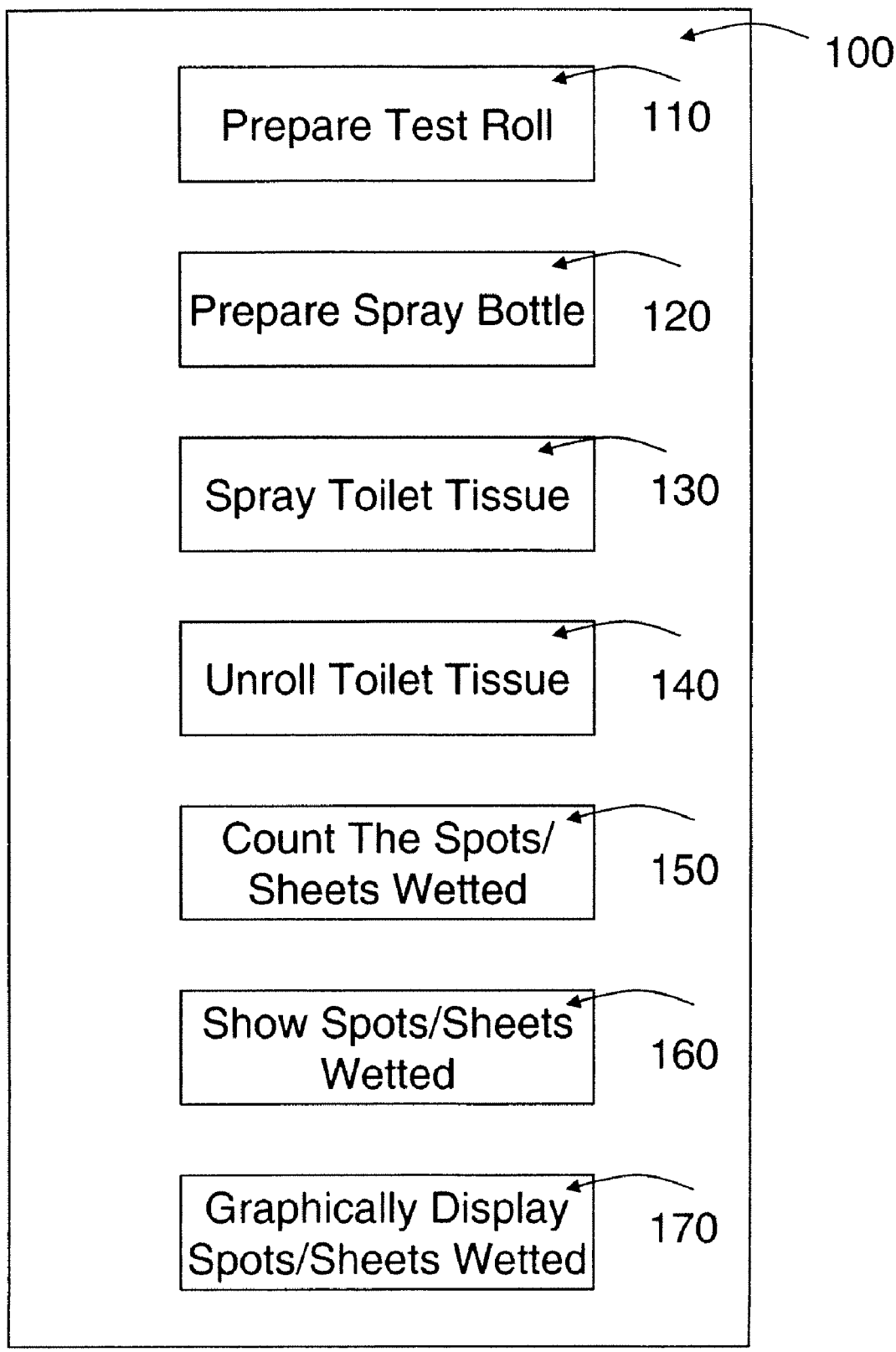
FIG. 3 is a schematic representation of an example of a method for demonstrating to a consumer absorbency-based consumption property differences between toilet tissue products according to the present invention.

A schematic illustration of steps involved in the Absorbency-Based Consumption Test Method of sanitary tissue products, for example toilet tissue products, is shown in FIG. 3. The overall method 100 is composed of a series of sequential steps selected to mimic how consumers use sanitary tissue products in real life conditions. However, the overall method 100 is done in a comparative manner so that the consumer can evaluate how different products within an array of branded products, or how products associated with different brands will perform under similar use conditions. These steps and conditions are selected based on actual in-use conditions measured via consumer testing.

The first step 110 of the process is simply to select two products for the side-by-side comparison of products. The first 10 sheets of each roll are removed to avoid any inconsistencies associated with the beginning of the roll. Then, each roll is loaded onto a roll holder so that the tail of the roll flips over the front of the roll (closest to the viewer). The tail of the roll is pulled down slightly so that it can be grasped during the demo. The tail orientation of each roll should be consistent.

The second step 120 involves preparing the spray bottle and solution. Each spray bottle is filled with water (~60 mls), two drops of blue food coloring is added to the spray bottle, capped, and then mixed thoroughly by shaking the bottle. The bottle is then primed by pressing down firmly on the spray trigger a few times. The bottle should now dispense a mist of water consistently. The sprayer used is commercially available from Sally Beauty Supply, part #265035, Denton, Tex., USA.

The third step 130 involves the application of approximately 0.45 ml of water to a surface of each roll, dispensed through 3 sprays on each stack of tissue with each spray dispensing 0.15 ml of water. The sprays are alternated between stacks to minimize time and volume differences dispensed on the two stacks. The sprays are directed to the center of the tissue roll. All 3 sprays to a single roll are done at a height of about 7.5 cm, generating a spray pattern of about 2.5 cm in diameter using a spray pulse duration of about 1 second each. The amount of water dispensed from the spray bottle to each stack is consistent with the average amount of moisture absorbed by a tissue stack or tissue wad during post-urinary drying or cleansing of human skin as determined through a consumer panel.

The fourth step 140 involves unwinding the rolls and inspecting the roll for soak-through spots. At least 3 seconds should elapse between the last/$3^{rd}$ spray and the time that the rolls are unwound for inspection. The rolls are slowly unwound as the top layer is inspected for the soak-through spots. Once the soak-through spots on the roll stop appearing, the unwinding is stopped.

The fifth step 150 involves counting the number of sheets wetted during the test. The counting can be based on the number of spots, the number of sheets unwound, or the length of tissue unwound during the inspection process. Sheets are counted from the beginning of the roll at the start of the test to the last sheet wetted during the spraying process.

The sixth step 160, an optional step, involves visually displaying the spots and/or sheets wetted.

The seventh step 170 is to collect data and graph and/or document the results. Experimental results are determined by counting the number of spots, number of sheets, or the length of the roll unwound during the inspection process after execution of the Absorbency-Based Consumption Test Method. Results are recorded in a laboratory notebook. Table 1 below summarizes the results obtained by this Absorbency-Based Consumption Test Method of a comparison of two leading toilet tissue products on the market in May 2007. Table 2 summarizes the results obtained by a consumer test of the same products placed in 2008.

TABLE 1

Laboratory Results (60 trial average)*

| Properties | Product | |
| --- | --- | --- |
| | Brand C/Ultra Soft | Brand S/1000 |
| Roll Size | Big Roll Size | 1000 Sheet Roll |
| Basis Weight (#/3000 sq.ft.) | 30.02 (s) | 11.29 |
| Caliper (mls) | 21.54 (s) | 5.5 |
| Absorbent Capacity (g/sheet) Vertical | 7.04 (s) | 1.8 |
| Absorbent Capacity (g/sheet) Horizontal | 14.04 | 4.5 |
| Average # of sheets wetted | 2.58 | 13.06 |

*implies significantly different at 95% confidence interval

TABLE 2

Consumer Test (Base Size 353)*

| Properties | Product | |
| --- | --- | --- |
| | Brand C/UltraSoft | Brand S/1000 |
| Average Sheets/Task | 7.10 (s) | 27.48 |

*implies significantly different at 95% confidence interval

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for demonstrating to a consumer absorbency-based consumption property differences between two or more rolled sanitary tissue products, the method comprising the steps of:
   a. comparatively subjecting a first rolled sanitary tissue product and a second, different rolled sanitary tissue product to an Absorbency-Based Consumption Test Method, which produces results that demonstrate to a consumer the absorbency-based consumption property differences between the first and second, different rolled sanitary tissue products; and
   b. presenting the results to the consumer.

2. The method according to claim 1 wherein the step of presenting the results to the consumer comprises airing a television commercial.

3. The method according to claim 1 wherein the step of presenting the results to the consumer comprises placing the results on the Internet.

4. The method according to claim 1 wherein the step of presenting the results to the consumer comprises distributing a print advertisement.

5. The method according to claim 1 wherein the step of presenting the results to the consumer comprises distributing the results on sanitary tissue product packages.

6. The method according to claim 1 wherein the step of presenting the results to the consumer comprises displaying the results on an in-store display.

7. The method according to claim 1 wherein the step of presenting the results to the consumer comprises displaying the results on a billboard.

8. The method according to claim 1 wherein the step of presenting the results to the consumer comprises visually, numerically and/or graphically presenting the results to the consumer.

9. The method according to claim 1 wherein the results comprise the number of sanitary tissue product sheets wetted from each of the first and second, different rolled sanitary tissue products.

10. The method according to claim 1 wherein the results comprise the length of sanitary tissue product wetted from each of the first and second, different rolled sanitary tissue products.

11. The method according to claim 1 wherein the Absorbency-Based Consumption Test Method comprises the steps of:
   a. applying moisture to the first and second, different rolled sanitary tissue products; and
   b. unwinding the moistened first and second, different rolled sanitary tissue products from the sanitary tissue product rolls such that the absorbency-based consumption property difference between the first and second, different rolled sanitary tissue products is visible to a consumer.

12. The method according to claim 1 wherein the rolled sanitary tissue products are paper towels or toilet tissue.

13. A method for demonstrating to a consumer absorbency-based consumption property differences between two sanitary tissue products, the method comprising the steps of:
   a. comparatively subjecting a first sanitary tissue product and a second, different sanitary tissue product to an Absorbency-Based Consumption Test Method, which produces results that demonstrate to a consumer the absorbency-based consumption property differences between the first and second, different sanitary tissue products, the Absorbency-Based Consumption Test Method comprising the steps of:
      selecting two rolls of different sanitary tissue products for comparison;
      preparing a solution;
      applying the solution to a surface of the rolls;
      partially unwinding the rolls; and
      counting the number of sheets of each of the rolls that were wetted during the applying step; and
   b. presenting the results to the consumer.

14. The method according to claim 13 wherein the solution comprises water and a colorant.

15. The method according to claim 13 wherein the solution is prepared in a spray bottle, and wherein the Absorbency-Based Consumer Test Method comprises the step of applying the solution to the surface of each of the rolls using the spray bottle.

16. The method according to claim 13 wherein the Absorbency-Based Consumption Test Method comprises the step of inspecting the rolls for soak-through spots during the step of partially unwinding the rolls.

17. The method according to claim 13 wherein the rolled sanitary tissue products are paper towels or toilet tissue.

18. A method for demonstrating to a consumer absorbency-based consumption property differences between two sanitary tissue products, the method comprising the steps of:
   a. comparatively subjecting a first sanitary tissue product and a second, different sanitary tissue product to an Absorbency-Based Consumption Test Method, which produces results that demonstrate to a consumer the absorbency-based consumption property differences between the first and second, different sanitary tissue products, the Absorbency-Based Consumption Test Method comprising the steps of:
      selecting two rolls of different sanitary tissue products for comparison;
      applying moisture to a surface of the rolls;
      partially unwinding the rolls; and
      counting the number of sheets of each of the rolls that were wetted during the applying step; and
   b. presenting the results to the consumer.

19. The method according to claim 18 comprising the step of preparing a solution comprising water and a colorant.

20. The method according to claim 18 wherein the Absorbency-Based Consumption Test Method comprises the step of inspecting the rolls for soak-through spots during the step of partially unwinding the rolls.

* * * * *